United States Patent
Yoshida

(10) Patent No.: US 8,570,578 B2
(45) Date of Patent: Oct. 29, 2013

(54) IMAGE PROCESSING APPARATUS, UPLOADING METHOD, AND NON-TRANSITORY COMPUTER-READABLE RECORDING MEDIUM ENCODED WITH UPLOADING PROGRAM FOR OUTPUTTING A TRANSMISSION COMPLETE SIGNAL AS A DUMMY SIGNAL

(75) Inventor: Okihisa Yoshida, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 74 days.

(21) Appl. No.: 13/289,189

(22) Filed: Nov. 4, 2011

(65) Prior Publication Data

US 2012/0133975 A1    May 31, 2012

(30) Foreign Application Priority Data

Nov. 29, 2010    (JP) .................................. 2010-265084

(51) Int. Cl.
  *G06F 3/12*    (2006.01)
(52) U.S. Cl.
  USPC ........................................................ 358/1.15

(58) Field of Classification Search
  None
  See application file for complete search history.

(56) References Cited

U.S. PATENT DOCUMENTS

| 7,243,079 | B1 * | 7/2007 | Manolis et al. ............ 705/26.81 |
| 2002/0093681 | A1 * | 7/2002 | Hitaka ........................ 358/1.15 |
| 2008/0027949 | A1 * | 1/2008 | Kawada ......................... 707/10 |
| 2009/0310175 | A1 * | 12/2009 | Yoshizumi et al. .......... 358/1.15 |

FOREIGN PATENT DOCUMENTS

JP    2007-189648 A    7/2007

\* cited by examiner

*Primary Examiner* — Jeremiah Bryar
(74) *Attorney, Agent, or Firm* — Buchanan Ingersoll & Rooney PC

(57) ABSTRACT

An image processing apparatus capable of performing at least one of scanning, printing, copying, and facsimile transmission/reception includes a communication portion, a job execution portion, a browsing portion, a monitoring portion, a data acquiring portion, an image transmitting portion, and a dummy signal output portion.

27 Claims, 9 Drawing Sheets

F I G. 2
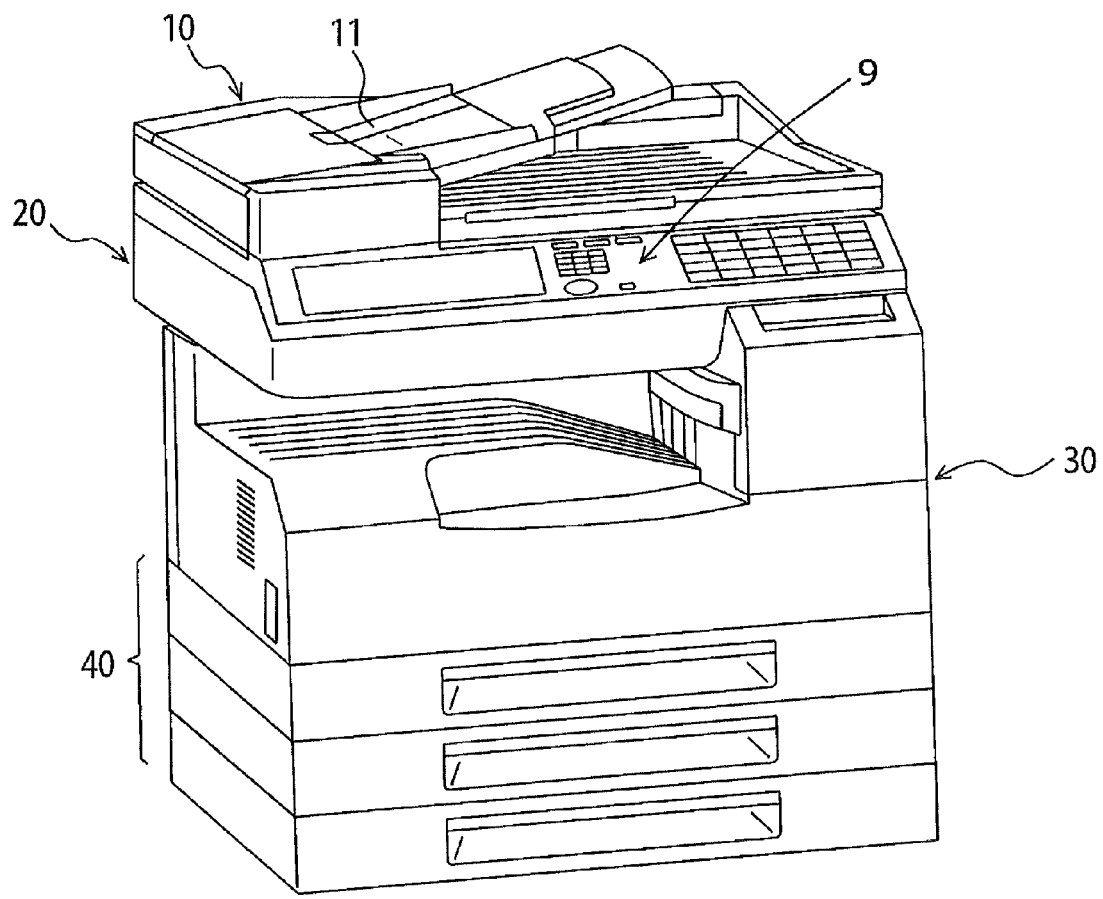

F I G. 4
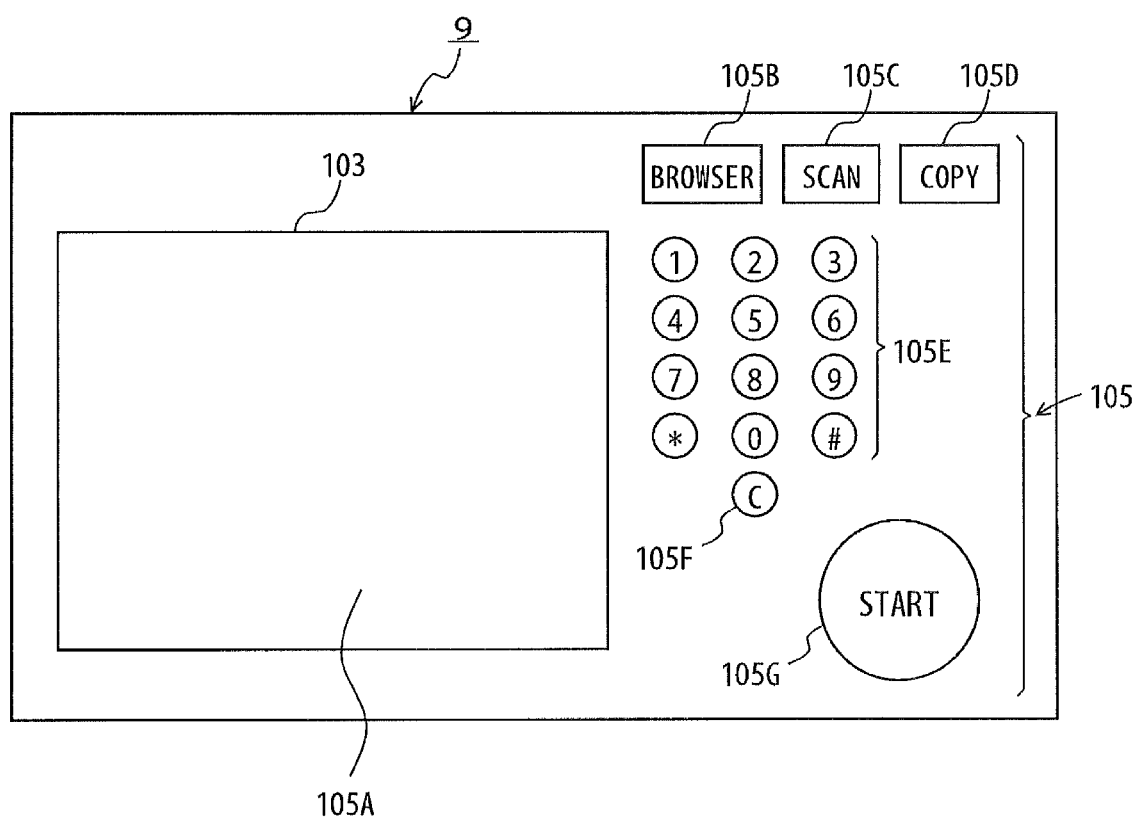

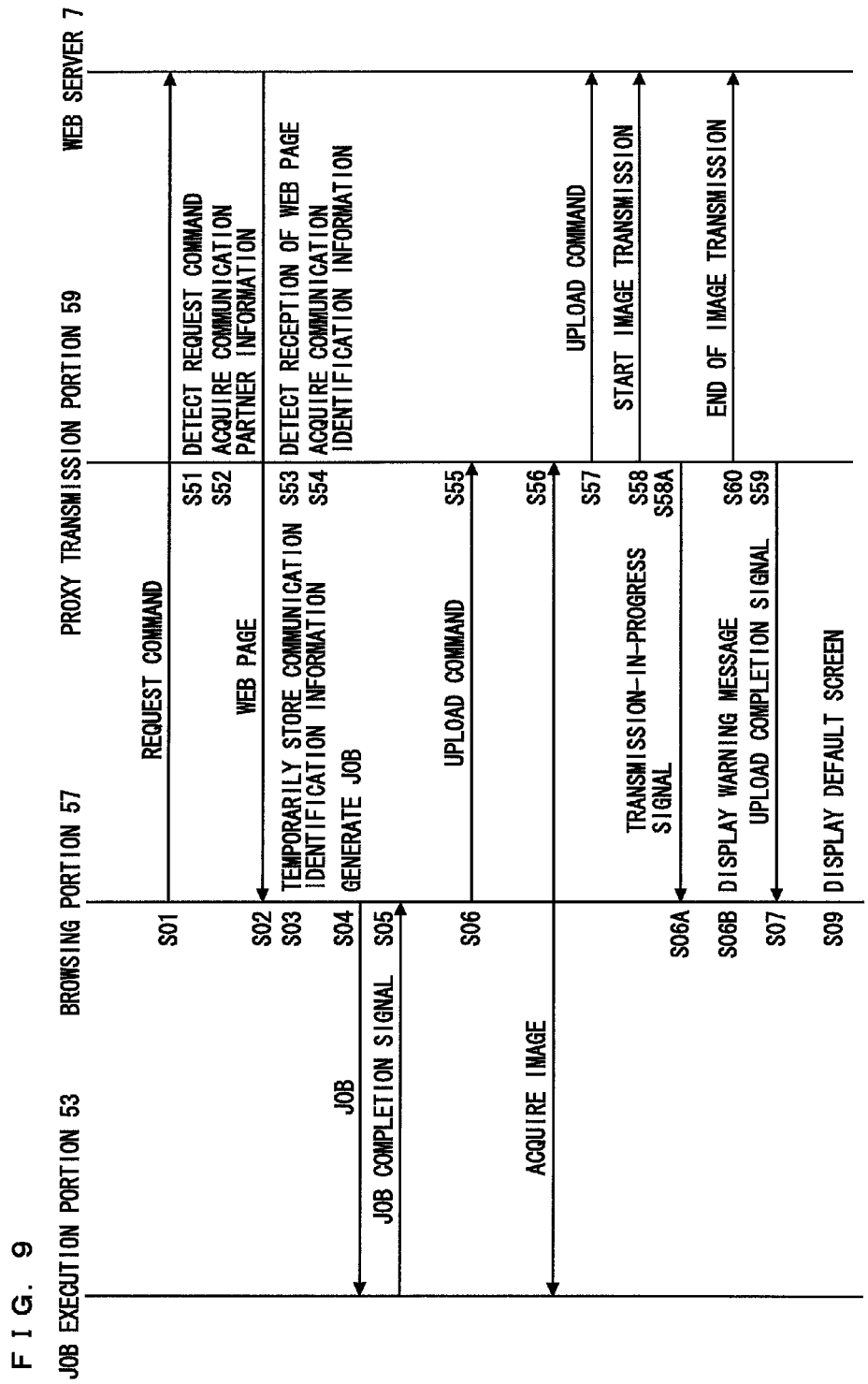

IMAGE PROCESSING APPARATUS, UPLOADING METHOD, AND NON-TRANSITORY COMPUTER-READABLE RECORDING MEDIUM ENCODED WITH UPLOADING PROGRAM FOR OUTPUTTING A TRANSMISSION COMPLETE SIGNAL AS A DUMMY SIGNAL

This application is based on Japanese Patent Application No. 2010-265084 filed with Japan Patent Office on Nov. 29, 2010, the entire content of which is hereby incorporated by reference.

BACKGROUND OF THE INVENTION

1. Field of the Invention

The present invention relates to an image processing apparatus, an uploading method, and a non-transitory computer-readable recording medium encoded with an uploading program. More particularly, the present invention relates to an image processing apparatus which is able to upload an image to a server, and an uploading method and a non-transitory computer-readable recording medium encoded with an uploading program which are carried out by the image processing apparatus.

2. Description of the Related Art

Some information processing apparatuses, typified by multi-function peripherals (hereinafter, referred to as "MFPs"), have browsing programs installed therein. A technique is known in which, to make a browser function in an MFP, a Web page for uploading a file is received from a server and data is transmitted to the destination designated in the received Web page. For example, Japanese Patent Laid-Open No. 2007-189648 discloses an information processing apparatus which includes: communication means for communicating with servers on a network; display means for displaying, with an Internet browser, contents for transmitting an image data file to one of the servers by the communication means by using a file upload function of the Internet browser; and file creating means for creating the image data file to be transmitted to the one of the servers, from an arbitrary image incorporated in accordance with an operation performed on the contents displayed on the display means, wherein the display contents displayed by the display means include a "send button" for transmitting a file, and the file creating means operates by recognizing an operation of depressing the "send button".

With this technique, however, while the browser function is being performed in the MFP, other basic functions included in the MFP such as a scanning function, a copying function, a printing function, and a facsimile transmitting/receiving function cannot be performed. For example, while a user causes the MFP to perform the browser function to upload data, the user cannot cause the MFP to perform other basic functions. If the data uploading requires a long time, the MFP cannot be used for a long period of time, hindering effective operations of the MFP.

SUMMARY OF THE INVENTION

According to an aspect of the present invention, an image processing apparatus capable of performing at least one of scanning, printing, copying, and facsimile transmission/reception includes: a communication portion which communicates with an external device; an interface portion which serves as an interface with a user; a job execution portion which executes at least one of a scan job, a print job, a copy job, and a facsimile transmission/reception job in accordance with an operation accepted by the interface portion; a browsing portion which communicates with a Web server via the communication portion in accordance with an operation accepted by the interface portion; a monitoring portion which monitors a communication between the browsing portion and the Web server to acquire communication partner information for specifying the Web server and communication identification information for identifying the communication between the browsing portion and the Web server; a data acquiring portion which, in response to an event that the monitoring portion detects an upload command for transmitting an image output from the job execution portion to the Web server, acquires the image to be transmitted on the basis of the upload command; an image transmitting portion which, on behalf of the browsing portion, transmits the acquired image to the Web server on the basis of the acquired communication partner information and the acquired communication identification information; and a dummy signal output portion which, on behalf of the Web server, outputs a completion signal indicating the completion of the uploading as a dummy signal to the browsing portion before the image transmitting portion finishes the transmission of the image.

According to another aspect of the present invention, an uploading method is carried out in an image processing apparatus, the image processing apparatus being capable of performing at least one of scanning, printing, copying, and facsimile transmission/reception, and including a communication portion which communicates with an external device, and an interface portion which serves as an interface with a user, wherein the uploading method causes the image processing apparatus to execute processing including: a job executing step of executing at least one of a scan job, a print job, a copy job, and a facsimile transmission/reception job in accordance with an operation accepted by the interface portion; a monitoring step of monitoring a communication between a browsing task and a Web server, the browsing task being formed by executing a browsing program to communicate with the Web server in accordance with an operation accepted by the interface portion, and acquiring communication partner information for specifying the Web server and communication identification information for identifying the communication between the browsing task and the Web server; an acquiring step of, in response to an event that an upload command for transmitting an image that is output as a result of execution of a job in the job executing step to the Web server is detected in the monitoring step, acquiring the image to be transmitted on the basis of the upload command; an image transmitting step of transmitting, on behalf of the browsing task, the acquired image to the Web server on the basis of the acquired communication partner information and the acquired communication identification information; and a dummy signal outputting step of outputting, on behalf of the Web server, a transmission completion signal as a dummy signal to the browsing task before the transmission of the image is finished in the image transmitting step.

According to a further aspect of the present invention, a non-transitory computer-readable recording medium is encoded with an uploading program carried out in a computer which controls an image processing apparatus, the image processing apparatus being capable of performing at least one of scanning, printing, copying, and facsimile transmission/reception, and including a communication portion which communicates with an external device, an interface portion which serves as an interface with a user, and a job execution portion which executes at least one of a scan job, a print job, a copy job, and a facsimile transmission/reception job in accordance with an operation accepted by the interface portion, wherein the uploading program causes the computer to execute processing including: a monitoring step of monitoring a communication between a browsing task and a Web server, the browsing task executing a browsing program, and acquiring communication partner information for specifying the Web server and communication identification information for identifying the communication between the browsing task and the Web server; an acquiring step of, in response to an event that an upload command for transmitting an image output from the job execution portion to the Web server is detected in the monitoring step, acquiring the image to be transmitted on the basis of the upload command; an image transmitting step of transmitting, on behalf of the browsing task, the acquired image to the Web server on the basis of the acquired communication partner information and the acquired communication identification information; and a dummy signal outputting step of outputting, on behalf of the Web server, a transmission completion signal as a dummy signal to the browsing task before the transmission of the image is finished in the image transmitting step.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a perspective view of an MFP;

FIG. 4 is a plan view showing an example of an operation panel;

FIG. 9 is a timing diagram illustrating an example of the flow of the processing performed in the MFP and a Web server according to the second embodiment.

DESCRIPTION OF THE PREFERRED EMBODIMENTS

Figure 1:
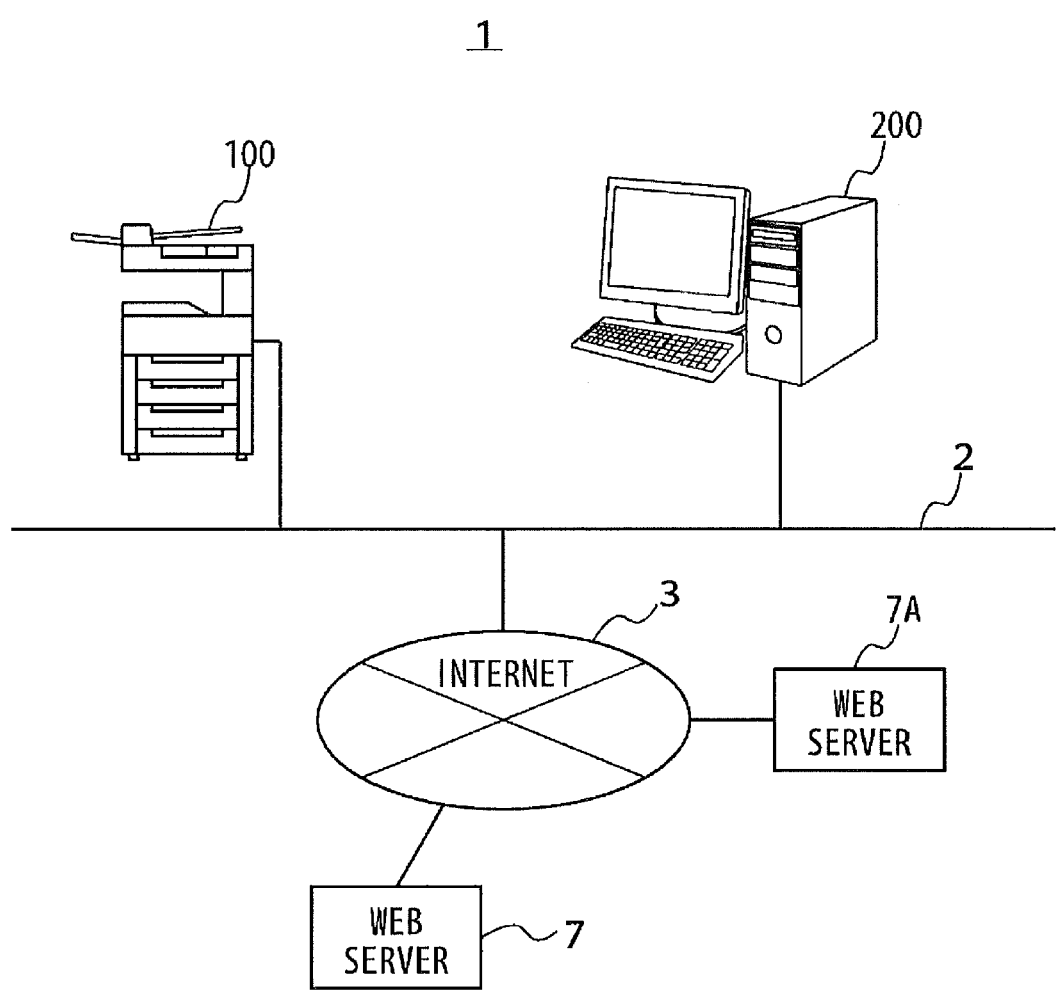
FIG. 1 schematically shows an information processing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows an information processing system according to an embodiment of the present invention. Referring to FIG. 1, an information processing system 1 includes a multi-function peripheral (MFP) 100 and a personal computer (PC) 200, which are each connected to a network 2, and Web servers 7 and 7A, which are each connected to the Internet 3. MFP 100, which is an example of an information processing apparatus, has a plurality of functions such as the scanner function, function as a printer, copying function, and facsimile transmitting/receiving function.

Network 2 is a local area network (LAN), which is connected to the Internet 3 via a gateway, thereby allowing MFP 100 to communicate with Web servers 7 and 7A that are connected to the Internet 3. The protocol used in communications between MFP 100 and Web servers 7 and 7A may be hypertext transfer protocol (HTTP), although it is not restricted thereto. Network 2 is not necessarily the LAN; it may be the Internet, a wide area network (WAN), public switched telephone networks (PSTN), and the like.

MFP 100 is able to execute a browsing program and has a browser function. For example, when a user designates a uniform resource locator (URL) of a Web page stored in Web server 7, MFP 100 requests Web server 7 to transmit the Web page specified by the URL, and receives and displays the Web page transmitted from Web server 7. Here, a Web page is text data which is written in a markup language such as hypertext markup language (HTML) or extensible markup language (XML). Hereinafter, the process performed by MFP 100 to receive and display a Web page will be referred to as a "browsing process".

Web servers 7 and 7A each transmit a Web page to MFP 100 in response to a request from MFP 100 which functions as a Web browser. Each of the Web pages transmitted from Web servers 7 and 7A includes a command for transmitting an image on the basis of communication partner information that is included in the command and indicates a destination of the image. The communication partner information may include the URL for specifying the one of Web servers 7 and 7A that has transmitted the Web page, or a URL for specifying another file server. Further, Web servers 7 and 7A each have a common gateway interface (CGI) and start an application program in response to a request from MFP 100 which functions as a Web browser. It is here assumed that Web servers 7 and 7A each function as a file server which, in response to a request from MFP 100, starts an application program to receive an image transmitted from MFP 100 and store the received image.

FIG. 2 is a perspective view of the MFP. Referring to FIG. 2, MFP 100 includes an operation panel 9, an automatic document feeder (ADF) 10, a document reading portion 20, an image forming portion 30, and a paper feeding portion 40.

ADF 10 automatically feeds a plurality of documents set on a document feed tray 11, one by one, to a predetermined document reading position set on a platen glass of document reading portion 20, and outputs the document, the image of which has been read by document reading portion 20, onto a document output tray. Document reading portion 20 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, to store the data in a memory or output the same to image forming portion 30.

Image forming portion 30 forms an image using well-known electrophotography. Image forming portion 30 performs various kinds of image processing such as shading compensation on image data received from document reading portion 20 and, on the basis of the processed image data, forms an image on a sheet of paper fed by paper feeding portion 40. Paper feeding portion 40 feeds a sheet of paper, stored in a paper feed tray, to image forming portion 30.

Figure 3:
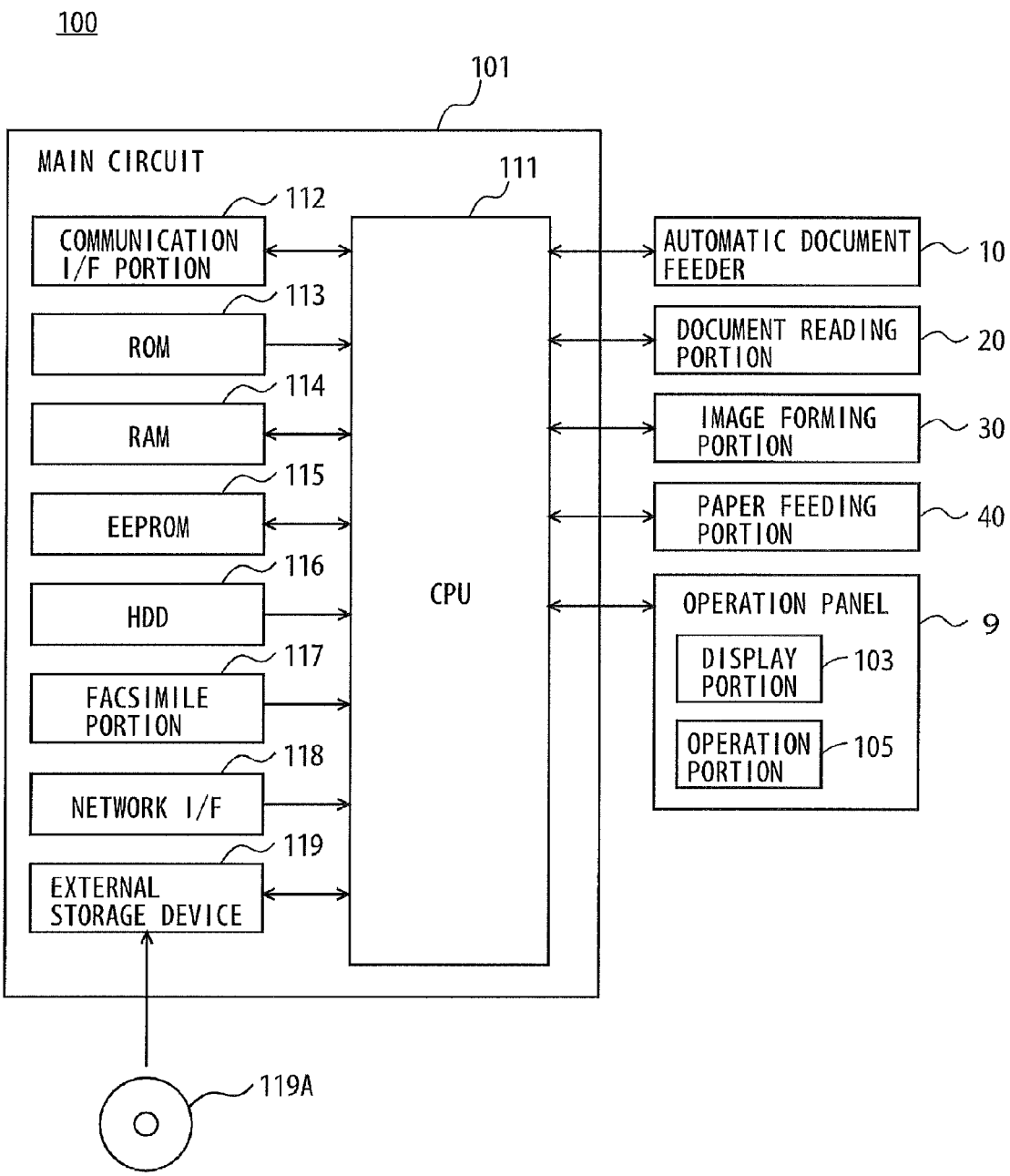
FIG. 3 is a block diagram showing an example of the hardware configuration of the MFP.

FIG. 3 is a block diagram showing an example of the hardware configuration of the MFP. Referring to FIG. 3, MFP 100 includes: a main circuit 101; ADF 10; document reading portion 20; image forming portion 30; paper feeding portion 40; and operation panel 9 serving as a user interface.

Main circuit 101 includes a CPU 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, a network interface (I/F) 118; and an external storage device 119 to which a compact disc ROM (CD-ROM) 119A may be mounted. CPU 111 is connected with ADF 10, document reading portion 20, image forming portion 30, paper feeding portion 40, and operation panel 9, and is responsible for overall control of MFP 100.

ROM 113 stores a program executed by CPU 111 and data necessary for execution of the program. RAM 114 is used as a work area when CPU 111 executes a program.

Communication I/F portion 112 is an interface for connecting MFP 100 to other devices through a serial communication cable. It is noted that they may be connected in a wired or wireless manner.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 30. Image forming portion 30 prints the facsimile data received by facsimile portion 117 on a sheet of paper. Further, facsimile portion 117 converts the data stored in HDD 116 to facsimile data, and transmits it to a facsimile machine connected to the PSTN.

Network I/F 118 is an interface for connecting MFP 100 to network 2. CPU 111 is capable of communicating with Web servers 7 and 7A connected to the Internet 3 via network I/F 118.

External storage device 119 is mounted with CD-ROM 119A. CPU 111 is capable of accessing CD-ROM 119A via external storage device 119, and loading a program, stored in CD-ROM 119A, into RAM 114 for execution. It is noted that the program executed by CPU 111 is not restricted to the program stored in CD-ROM 119A. It may be a program stored in another storage medium, or in HDD 116. Still alternatively, it may be a program written into HDD 116 by another computer connected to network 2 via network I/F 118.

It is noted that the storage medium for storing a program is not restricted to CD-ROM 119A. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

As used herein, the "program" includes, not only the program which CPU 111 can execute directly, but also a source program, a compressed program, an encrypted program, and others.

Operation panel 9 is provided on an upper surface of MFP 100, and includes a display portion 103 and an operation portion 105. FIG. 4 is a plan view showing an example of the operation panel. Referring to FIG. 4, operation panel 9 includes display portion 103 and operation portion 105. Display portion 103 is a display such as a liquid crystal display or an organic electro-luminescence display (ELD), and displays an instruction menu for a user, information about acquired image data, and others.

Operation portion 105 accepts an operation by a user to output the accepted operation to CPU 111. Operation portion 105 includes: a touch panel 105A overlaid on display portion 103; a browser key 105B to which an operation for instructing execution of a browsing process is assigned; a scan key 105C to which an operation for instructing execution of a scan process is assigned; a copy key 105D to which an operation for instructing execution of a copy process is assigned; a ten-key pad 105E; a clear key 105F for cancelling the input content; and a start key 105G. Touch panel 105A, which is made of a transparent member, is overlaid on display portion 103. When a user touches touch panel 105A with the finger, touch panel 105A detects the touched position as a designated position, and outputs the designated position to CPU 111.

Figure 5:
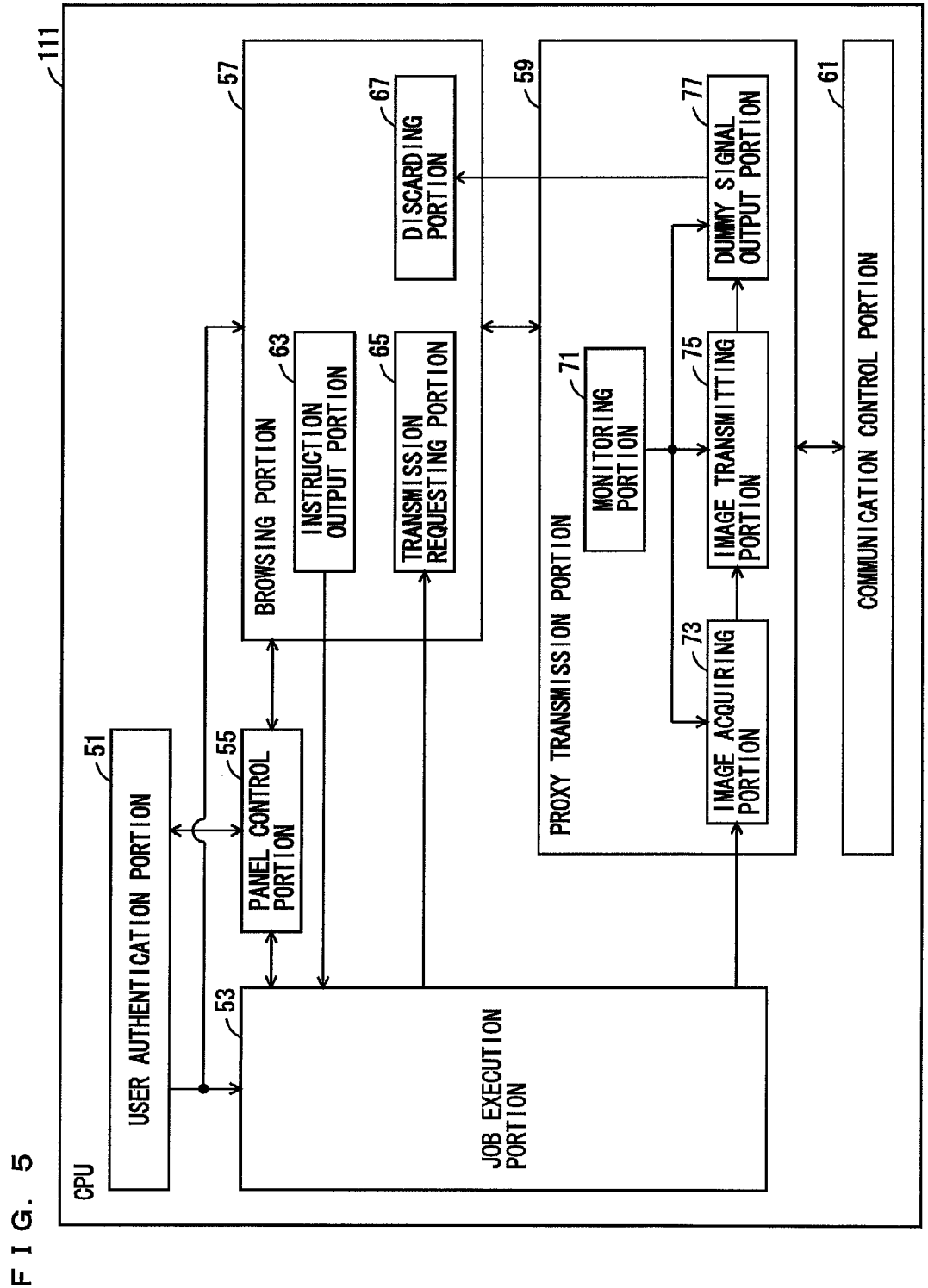
FIG. 5 is a block diagram schematically showing the functions of a CPU included in the MFP according to a first embodiment.

FIG. 5 is a block diagram schematically showing the functions of the CPU included in the MFP according to the present embodiment. The functions of CPU 111 shown in FIG. 5 are implemented as CPU 111 executes a browsing program and an uploading program stored in ROM 113, EEPROM 115, HDD 116, or CD-ROM 119A.

Referring to FIG. 5, CPU 111 includes: a user authentication portion 51 to authenticate a user who operates MFP 100; a job execution portion 53 to execute a job; a panel control portion 55 to control operation panel 9; a browsing portion 57; a proxy transmission portion 59; and a communication control portion 61 to control network I/F 118. Browsing portion 57 is the function that is formed in CPU 111 as CPU 111 executes a browsing program stored in ROM 113, EEPROM 115, HDD 116, or CD-ROM 119A. Job execution portion 53, panel control portion 55, and communication control portion 61 are the functions that are formed in CPU 111 as CPU 111 executes firmware which is a basic program installed in MFP 100. Proxy transmission portion 59 is the function that is formed in CPU 111 as CPU 111 executes an uploading program stored in ROM 113, EEPROM 115, HDD 116, or CD-ROM 119A.

User authentication portion 51 inputs data from and outputs data to panel control portion 55, to cause an authentication screen to be displayed on display portion 103 so as to accept a user ID and a password that a user inputs to operation portion 105. For example, combinations of user IDs and passwords for users who have been permitted to use MFP 100 in advance are stored in EEPROM 115. If the same combination of user ID and password as the accepted one is stored in EEPROM 115, user authentication portion 51 authenticates the user to permit login, while if the same combination is not stored therein, user authentication portion 51 does not authenticate the user or permit login thereof. When authenticating a user, user authentication portion 51 outputs the user ID to job execution portion 53 and browsing portion 57. Once the user ID is received from user authentication portion 51, job execution portion 53 and browsing portion 57 each handle any operation input to operation portion 105 controlled by panel control portion 55 as an operation input by the logged-in user, until the user logs out.

Job execution portion 53 controls ADF 10, document reading portion 20, image forming portion 30, paper feeding portion 40, and HDD 116, for execution of jobs. A job is a process for implementing a function included in MFP 100. The jobs include: a scan job for executing a scanning function; a print job for executing a printing function; a copy job for executing a copying function; a facsimile transmission/reception job for executing a facsimile function; and an image input/output job for executing an image management function. The image input/output job includes an image read job for reading an image stored in HDD 116 and an image write job for writing an image to HDD 116, each using a function other than the scanning, printing, copying, and facsimile functions described above. Job execution portion 53 executes a job on the basis of an instruction to execute the job that is input from panel control portion 55 or browsing portion 57.

Panel control portion 55 controls operation panel 9. Specifically, panel control portion 55 controls display on display portion 103, and also accepts an operation input to operation portion 105. Panel control portion 55 displays an operation screen on display portion 103. When a user inputs an operation for executing a job to operation portion 105, panel control portion 55 outputs an instruction to execute the job to job execution portion 53. Panel control portion 55 further causes a Web page input from browsing portion 57 to be displayed on display portion 103. When a user inputs an operation to operation portion 105 in accordance with the Web page, panel control portion 55 outputs the input operation to browsing portion 57. As a result, operation panel 9 functions as a user interface via which the user causes browsing portion 57 and job execution portion 53 to carry out processing. While a user is inputting an operation for browsing portion 57 to operation panel 9, the user is not able to input an operation for job execution portion 53. Similarly, while a user is inputting an operation for job execution portion 53 to operation panel 9, the user is not able to input an operation for browsing portion 57.

Communication control portion 61 controls network I/F 118 to connect CPU 111 to network 2.

Browsing portion 57 communicates with Web servers 7 and 7A via communication control portion 61. When a user inputs a network address of a Web page to operation portion 105, browsing portion 57 accepts the input network address from panel control portion 55, and acquires the Web page specified by the network address input by the user. Here, it is assumed that a user inputs a network address assigned to an upload screen which is a Web page stored in Web server 7 and which is used for uploading an image to Web server 7. The network address includes information for specifying Web server 7 and information for identifying the upload screen stored in Web server 7. Here, a URL is used as the network address.

Specifically, in order to request Web server 7 to transmit the upload screen specified by the URL input by the user, browsing portion 57 transmits a request command including the network address of the upload screen via communication control portion 61 to Web server 7 connected to network 2. The request command is, for example, a GET command or a POST command conforming to the communication protocol of HTTP.

When receiving a request command from browsing portion 57, communication control portion 61 controls network I/F 118 to transmit the request command to Web server 7 connected to network 2. When Web server 7 receives the request command, it returns to MFP 100 the upload screen specified by the URL included in the request command. Communication control portion 61 in turn acquires the upload screen received by network I/F 118. When returning the upload screen, Web server 7 also transmits to MFP 100 communication identification information for identifying the communication with the task in MFP 100, i.e. browsing portion 57 here, that has issued the request command. Thus, communication control portion 61 outputs the communication identification information, received together with the upload screen, to browsing portion 57. In this manner, the communication between browsing portion 57 and Web server 7 is identified by the communication identification information. In this example, the communication identification information is determined by Web server 7.

Thereafter, each time browsing portion 57 communicates with Web server 7, browsing portion 57 uses the communication identification information to transmit data to and receive data from Web server 7. More specifically, browsing portion 57 adds the communication identification information to data to be transmitted, and receives data to which the communication identification information has been added. The communication identification information may be session identification information for identifying the communication session which has been established between MFP 100 and Web server 7, or may be a cookie which is transmitted from Web server 7.

When browsing portion 57 receives an upload screen from Web server 7 via communication control portion 61, browsing portion 57 outputs the upload screen to panel control portion 55. Panel control portion 55 in turn displays the upload screen received from browsing portion 57, on display portion 103. This allows the user to access the upload screen which is a Web page.

Figure 6:
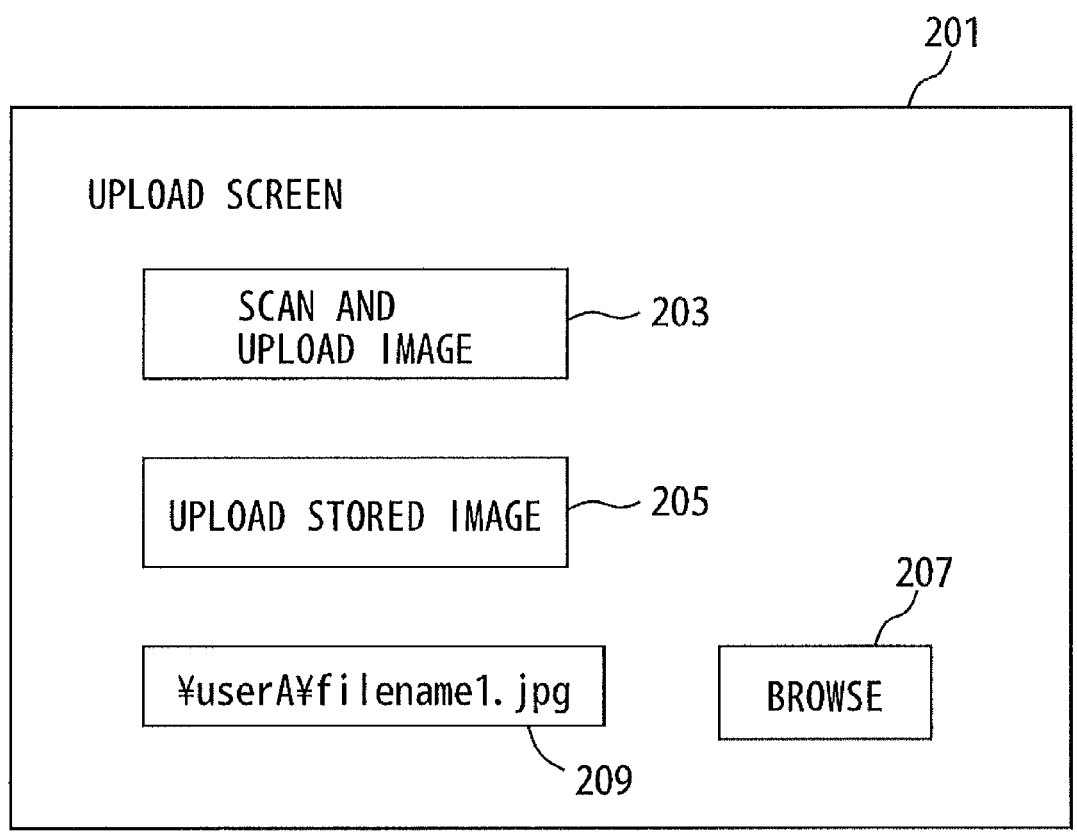
FIG. 6 shows an example of an upload screen.

FIG. 6 shows an example of an upload screen. Referring to FIG. 6, an upload screen 201 includes a button 203 having the characters "Scan and Upload Image" displayed thereon, a button 205 having the characters "Upload Stored Image" displayed thereon, a button 207 having the characters "Browse" displayed thereon, and a field 209 in which a file name of an image is displayed in the form of full path.

Returning to FIG. 5, in the case where a user inputs to operation portion 105 an operation of designating button 203 included in upload screen 201 while the screen is being displayed on display portion 103, panel control portion 55 outputs a signal indicating that button 203 has been designated, to browsing portion 57.

In the case where the user inputs to operation portion 105 an operation of designating button 207 while upload screen 201 is being displayed on display portion 103, panel control portion 55 displays a list of file names of the images stored in HDD 116 on display portion 103, so as to be overlaid on top of upload screen 201. When the user inputs to operation portion 105 an operation of designating a file name while the list of the file names is being displayed on display portion 103, panel control portion 55 erases the file name list from display portion 103, and displays the designated file name in field 209 in upload screen 201. In the case where the user inputs to operation portion 105 an operation of designating button 205 while upload screen 201 is being displayed on display portion 103, panel control portion 55 outputs the file name displayed in field 209 and a signal indicating that button 205 has been designated, to browsing portion 57.

Browsing portion 57 includes an instruction output portion 63, a transmission requesting portion 65, and a discarding portion 67. After upload screen 201 received from Web server 7 is output to panel control portion 55, when a signal indicating that button 203 has been designated is input from panel control portion 55, instruction output portion 63 generates and outputs a scan job to job execution portion 53. The scan job is a process of causing document reading portion 20 to read an image of a document.

Job execution portion 53, in response to receipt of a scan job from browsing portion 57, causes document reading portion 20 to read an image of a document, and stores the document image output from document reading portion 20 in RAM 114. When the reading operation by document reading portion 20 is completed, job execution portion 53 outputs a job completion signal to browsing portion 57 together with the file name of the document image that has been stored in RAM 114.

After upload screen 201 received from Web server 7 is output to panel control portion 55, when a file name and a signal indicating that button 205 has been designated are input from panel control portion 55, instruction output portion 63 generates and outputs an image read job to job execution portion 53. The image read job includes the file name input from panel control portion 55. The image read job is a process of reading the image specified by the file name from among the images stored in HDD 116.

Job execution portion 53, in response to receipt of an image read job from browsing portion 57, reads the image specified by the file name included in the image read job from within HDD 116, and stores the read image in RAM 114. When the operation of reading the image from HDD 116 is completed, job execution portion 53 outputs a job completion signal indicating that the image read job has been completed to browsing portion 57, together with the file name of the image that has been stored in RAM 114.

Transmission requesting portion 65, in response to receipt of a job completion signal and a file name from job execution portion 53, outputs an upload command to proxy transmission portion 59 so as to transmit the image specified by the file name to Web server 7. The upload command here is a command conforming to the communication protocol of file transfer protocol (FTP), and includes the file name for identifying the image stored in RAM 114.

Proxy transmission portion 59 is provided between browsing portion 57 and communication control portion 61. Proxy transmission portion 59 includes a monitoring portion 71, an image acquiring portion 73, an image transmitting portion 75, and a dummy signal output portion 77. Monitoring portion 71 monitors inputs/outputs of data between browsing portion 57 and communication control portion 61. Monitoring portion 71 refers to the URL included in a request command output from browsing portion 57 to acquire communication partner information for specifying the destination of the request command. Further, when communication control portion 61 receives an upload screen from Web server 7 in response to a transmission of a request command, monitoring portion 71 acquires from communication control portion 61 communication identification information that communication control portion 61 receives from Web server 7 together with the upload screen. Still further, when a predetermined upload command is input from browsing portion 57, monitoring portion 71 outputs the upload command to image acquiring portion 73 and image transmitting portion 75, and outputs the communication identification information to dummy signal output portion 77.

Image acquiring portion 73, in response to receipt of an upload command from monitoring portion 71, acquires from RAM 114 the image to be transmitted that is specified by the file name included in the upload command. In the case of scanning and uploading an image, the image to be transmitted is a document image. In the case of uploading a stored image, it is the image selected by the user from among the images stored in HDD 116. Image acquiring portion 73 outputs the acquired image to image transmitting portion 75.

Image transmitting portion 75, in response to receipt of an upload command from monitoring portion 71, outputs the upload command to communication control portion 61. As a result, the upload command output from browsing portion 57 is transmitted to Web server 7. In this manner, image transmitting portion 75, instead of browsing portion 57, performs the process that should be performed with communication control portion 61 for transmitting an image. In other words, the process that is supposed to be performed by browsing portion 57 for transmitting an image to Web server 7 is carried out by image transmitting portion 75 on behalf of browsing portion 57. On the communication control portion 61 side, every data input from or output to image transmitting portion 75 includes the communication identification information, so that communication control portion 61 determines that it is inputting the data from or outputting the data to browsing portion 57. Furthermore, while Web server 7 receives data transmitted from communication control portion 61 via network I/F 118, the image includes the communication identification information, so that Web server 7 determines that the data has been transmitted from browsing portion 57.

In the case where monitoring portion 71 detects certificate information and/or an encryption scheme used in a communication between Web server 7 and browsing portion 57, monitoring portion 71 outputs the detected certificate information and/or encryption scheme to image transmitting portion 75. When receiving the certificate information and/or encryption scheme from monitoring portion 71, image transmitting portion 75 uses the received certificate information and/or encryption scheme to transmit the acquired image to Web server 7, on behalf of browsing portion 57.

When Web server 7 completes the image uploading, it transmits an upload completion signal to browsing portion 57. When network I/F 118 receives the upload completion signal, image transmitting portion 75 receives the upload completion signal from communication control portion 61.

Dummy signal output portion 77 receives communication identification information from monitoring portion 71. When a transmission of an image by image transmitting portion 75 is started, dummy signal output portion 77 outputs an upload completion signal to browsing portion 57, on the basis of the communication identification information. It is noted that dummy signal output portion 77 may output the upload completion signal to browsing portion 57 any time after the communication identification information has been received from monitoring portion 71 and an upload command has been output from image transmitting portion 75 to communication control portion 61. For example, the upload completion signal may be output even before the image transmission is started. The upload completion signal is identical to the one that Web server 7 transmits to MFP 100 upon completion of image uploading. Accordingly, when browsing portion 57 receives the upload completion signal from dummy signal output portion 77, browsing portion 57 determines that the signal has been transmitted from Web server 7. Dummy signal output portion 77 outputs an upload completion signal to browsing portion 57 when the communication identification information is input from monitoring portion 71. This means that the time when dummy signal output portion 77 outputs the upload completion signal precedes the time when the image transmission by image transmitting portion 75 to Web server 7 is completed.

When discarding portion 67 included in browsing portion 57 receives an upload completion signal from dummy signal output portion 77, discarding portion 67 discards the communication identification information received from Web server 7. This terminates the communication session established in browsing portion 57 with Web server 7. As a result, when a user inputs a new URL, browsing portion 57 is able to establish a new communication session on the basis of the URL to communicate with one of Web servers 7 and 7A to thereby receive a new Web page for display. For example, even if a new user inputs the same URL as that of the upload screen the previous user had input, browsing portion 57 communicates with Web server 7 in another communication session to display the upload screen on display portion 103. Using the different communication sessions in this manner prevents the image uploaded by the previous user from being displayed on display portion 103, which ensures confidentiality.

It has been assumed here that browsing portion 57 outputs an upload command to proxy transmission portion 59 and proxy transmission portion 59 in turn transmits the upload command to Web server 7. Alternatively, it may be configured such that browsing portion 57 transmits an upload command to Web server 7 via communication control portion 61, and when proxy transmission portion 59 detects the upload command, proxy transmission portion 59, in place of browsing portion 57, carries out the process of transmitting an image to Web server 7.

In this case, when transmission requesting portion 65 receives a job completion signal and a file name from job execution portion 53, transmission requesting portion 65 transmits an upload command via communication control portion 61 to Web server 7 connected to network 2, so as to transmit the image specified by the file name to Web server 7. When monitoring portion 71 detects that a predetermined upload command has been output from browsing portion 57 to communication control portion 61, monitoring portion 71 outputs the upload command to image acquiring portion 73, outputs communication partner information and communication identification information to image transmitting portion 75, and outputs the communication identification information to dummy signal output portion 77. Further, image transmitting portion 75 outputs to communication control portion 61 a set of the image received from image acquiring portion 73 and the communication partner information and the communication identification information received from monitoring portion 71. In this manner, after browsing portion 57 outputs an upload command, image transmitting portion 75, rather than browsing portion 57, performs the process to be performed with communication control portion 61 for transmitting an image to Web server 7. In other words, the process that is supposed to be performed by browsing portion 57 for transmitting an image to Web server 7 is carried out by image transmitting portion 75 on behalf of browsing portion 57. On the communication control portion 61 side, as every data input from or output to image transmitting portion 75 includes the communication identification information, communication control portion 61 determines that it is inputting the data from or outputting the data to browsing portion 57. While Web server 7 receives data transmitted from communication control portion 61 via network I/F 118, the image includes the communication identification information, so that Web server 7 determines that the data has been transmitted from browsing portion 57.

Figure 7:
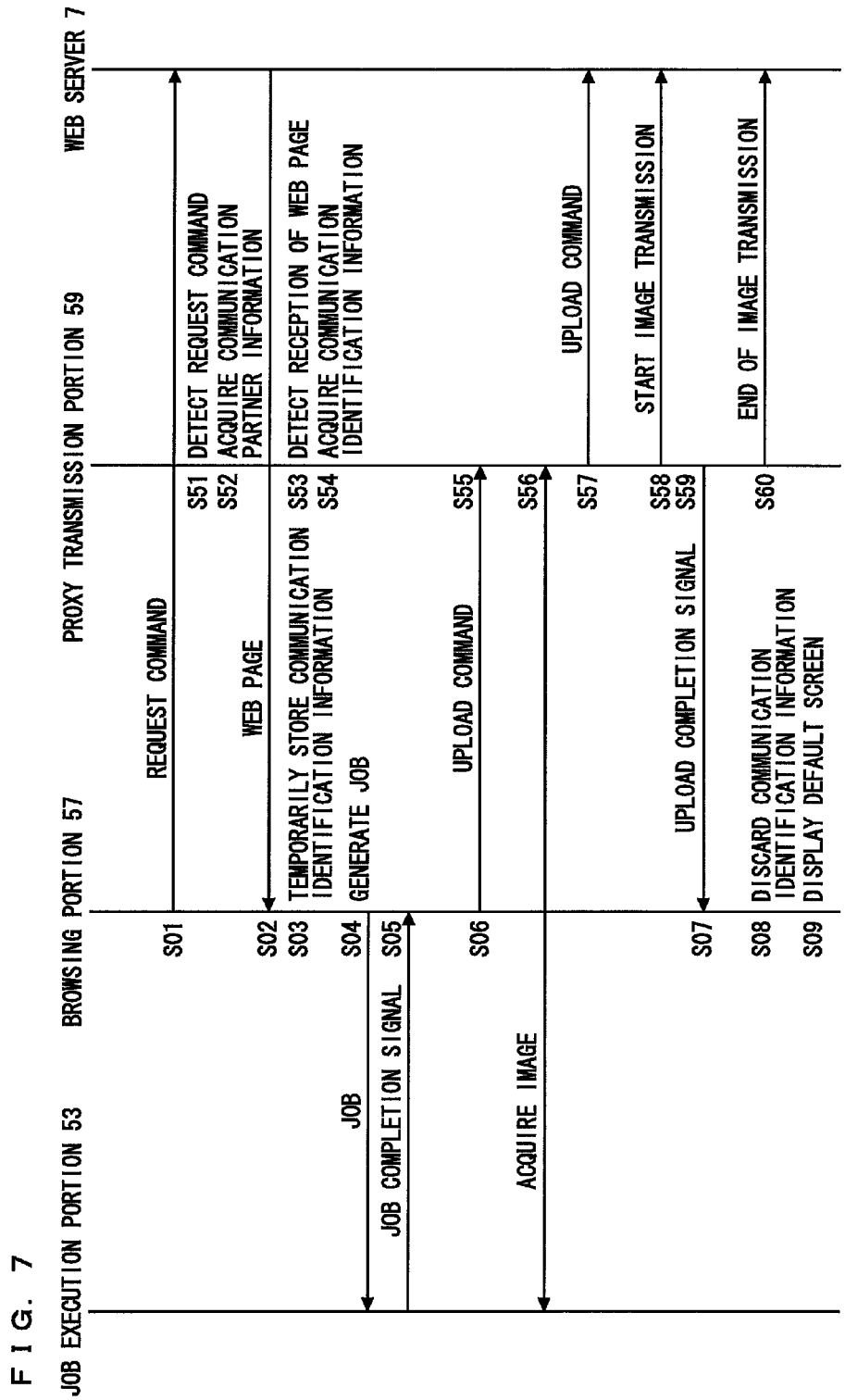
FIG. 7 is a timing diagram illustrating an example of the flow of the processing performed in the MFP and a Web server according to the first embodiment.

FIG. 7 is a timing diagram illustrating an example of the flow of the processing performed in the MFP and the Web server. The processing performed in MFP 100 corresponds to the processing carried out by job execution portion 53, browsing portion 57, and proxy transmission portion 59 in CPU 111 included in MFP 100. The processing of job execution portion 53, browsing portion 57, and proxy transmission portion 59 is carried out by CPU 111 as CPU 111 executes the uploading program and the browsing program stored in ROM 113, EEPROM 115, HDD 116, or CD-ROM 119A.

Referring to FIG. 7, browsing portion 57 requests a Web page (step S01). Specifically, browsing portion 57 transmits a request command including a URL of the Web page to Web server 7. For example, when browser key 105B included in operation portion 105 is depressed and a URL of a Web page is input to operation portion 105, a request command including the URL is transmitted to Web server 7.

The request command output from browsing portion 57 is transmitted to Web server 7 via communication control portion 61.

Proxy transmission portion 59 detects the request command output from browsing portion 57 to communication control portion 61 (step S51), and acquires communication partner information for identifying the device to which the request command is to be transmitted (step S52). Here, the communication partner information is acquired on the basis of the URL included in the request command.

When Web server 7 receives the request command, it returns the Web page to MFP 100, so that communication control portion 61 receives the Web page. Proxy transmission portion 59 detects that communication control portion 61 has received the Web page transmitted from Web server 7 (step S53), and acquires communication identification information (step S54). Specifically, proxy transmission portion 59 acquires, as the communication identification information, session identification information or a cookie which is received together with the Web page.

On the other hand, browsing portion 57 which has output the request command receives from communication control portion 61 the Web page received by communication control portion 61 (step S02), and temporarily stores the communication identification information received together with the Web page (step S03). The communication identification information may be session identification information or a cookie.

When browsing portion 57 accepts an upload instruction, browsing portion 57 generates a job for acquiring the image designated as an object to be uploaded, and outputs the generated job to job execution portion 53 (step S04). For example in the case where upload screen 201 shown in FIG. 6 is received as a Web page, the upload instruction is an instruction that is input when button 203 or button 205 included in upload screen 201 and associated with a file transfer command of FTP or other communication protocol is depressed. For example in the case where the designated image is an image to be scanned, browsing portion 57 generates a scan job for reading a document, and outputs the generated job to job execution portion 53. In the case where the designated image is an image stored in HDD 116, browsing portion 57 generates an image read job for reading the image specified by the file name from among the images stored in HDD 116, and outputs the generated job to job execution portion 53.

Job execution portion 53 outputs a job completion signal upon completion of the execution of the job. When browsing portion 57 receives the job completion signal from job execution portion 53 (step S05), browsing portion 57 outputs an upload command to communication control portion 61 (step S06). The upload command, which is to be transmitted to Web server 7 via network I/F 118, is input to proxy transmission portion 59 (step S55).

When proxy transmission portion 59 detects the upload command in step S55, proxy transmission portion 59 acquires an image from job execution portion 53 (step S56). Specifically, proxy transmission portion 59 acquires the image on the basis of the file name included in the upload command.

Then, in the following step S57, proxy transmission portion 59, on behalf of browsing portion 57, outputs the upload command detected in step S55 to communication control portion 61. In this manner, the upload command output from browsing portion 57 is transmitted via communication control portion 61 to Web server 7. The upload command is a command for uploading to Web server 7 the image output from job execution portion 53. In the following step S58, proxy transmission portion 59, on behalf of browsing portion 57, starts transmitting an image via communication control portion 61.

Thereafter, proxy transmission portion 59 outputs an upload completion signal to browsing portion 57 by using the communication partner information acquired in step S52 and the communication identification information acquired in step S54 (step S59). The upload completion signal is identical to the signal that Web server 7 transmits to MFP 100 upon completion of the uploading of the image. When proxy transmission portion 59 detects an upload completion signal transmitted from Web server 7, proxy transmission portion 59 transmits to Web server 7 a signal indicating the end of image transmission (step S60).

On the other hand, browsing portion 57 receives the upload completion signal output from proxy transmission portion 59 (step S07), discards the communication identification information temporarily stored in step S03 (step S08), and displays a default screen on display portion 103 (step S09). As the communication identification information is discarded in step S08, the communication session with Web server 7 is terminated. This prevents the image output from job execution portion 53 from being displayed on display portion 103.

As described above, MFP 100 according to the first embodiment includes: network I/F 118 which communicates with Web server 7; operation panel 9 serving as an interface with a user; job execution portion 53 which executes a job in accordance with an operation accepted by operation panel 9; browsing portion 57 which communicates with Web server 7 via network I/F 118 in accordance with an operation accepted by operation panel 9; and proxy transmission portion 59 which is provided between browsing portion 57 and Web server 7. Proxy transmission portion 59 includes: monitoring portion 71 which monitors a communication between browsing portion 57 and Web server 7; image acquiring portion 73 which, in response to detection by monitoring portion 71 of an upload command for transmitting an image to Web server 7, acquires on the basis of the upload command the image to be transmitted; image transmitting portion 75 which, on behalf of browsing portion 57, transmits the acquired image to Web server 7 by using the communication partner information for specifying Web server 7 and the communication identification information for identifying the communication between browsing portion 57 and Web server 7, the information being detected by monitoring portion 71; and dummy signal output portion 77 which, on behalf of Web server 7, outputs an upload completion signal indicating the completion of uploading as a dummy signal to browsing portion 57 before image transmitting portion 75 finishes the transmission of the image.

Accordingly, when browsing portion 57 receives the upload completion signal, browsing portion 57 terminates the communication with Web server 7, so that operation panel 9 is released from browsing portion 57 and gets ready to accept a next operation. This enables job execution portion 53 to execute a job such as scanning, printing, copying, or facsimile transmission/reception in accordance with the operation input to operation panel 9. As such, the time taken by browsing portion 57 to communicate with Web server 7 is shortened, thereby allowing a longest possible time to be secured for job execution portion 53 to execute jobs.

Further, after browsing portion 57 receives an upload completion signal, browsing portion 57 discards the communication identification information that was determined between browsing portion 57 and Web server 7 when browsing portion 57 communicated with Web server 7. This prevents the image transmitted to Web server 7 according to the upload command from being displayed again by browsing portion 57.

Furthermore, the communication identification information is determined between browsing portion 57 and Web server 7 when browsing portion 57 communicates with Web server 7 on the basis of an operation input to operation panel 9 by an operator authenticated by user authentication portion 51. This can make a newly authenticated and logged-in user unable to view an image uploaded to Web server 7 by a previously logged-in user. This prevents leakage of the image, thereby ensuring confidentiality.

Second Embodiment

In MFP 100 according to the first embodiment, browsing portion 57 includes discarding portion 67. After transmission requesting portion 65 transmits an upload command, when an upload completion signal is received from proxy transmission portion 59, discarding portion 67 discards the communication identification information to thereby terminate the communication session on the browsing portion 57 side. In the second embodiment, browsing portion 57 maintains the communication session without discarding the communication identification information. The overall configuration of the information processing system and the hardware configuration of MFP 100 are identical to those in the first embodiment, and thus, a description thereof will not be repeated here.

Figure 8:
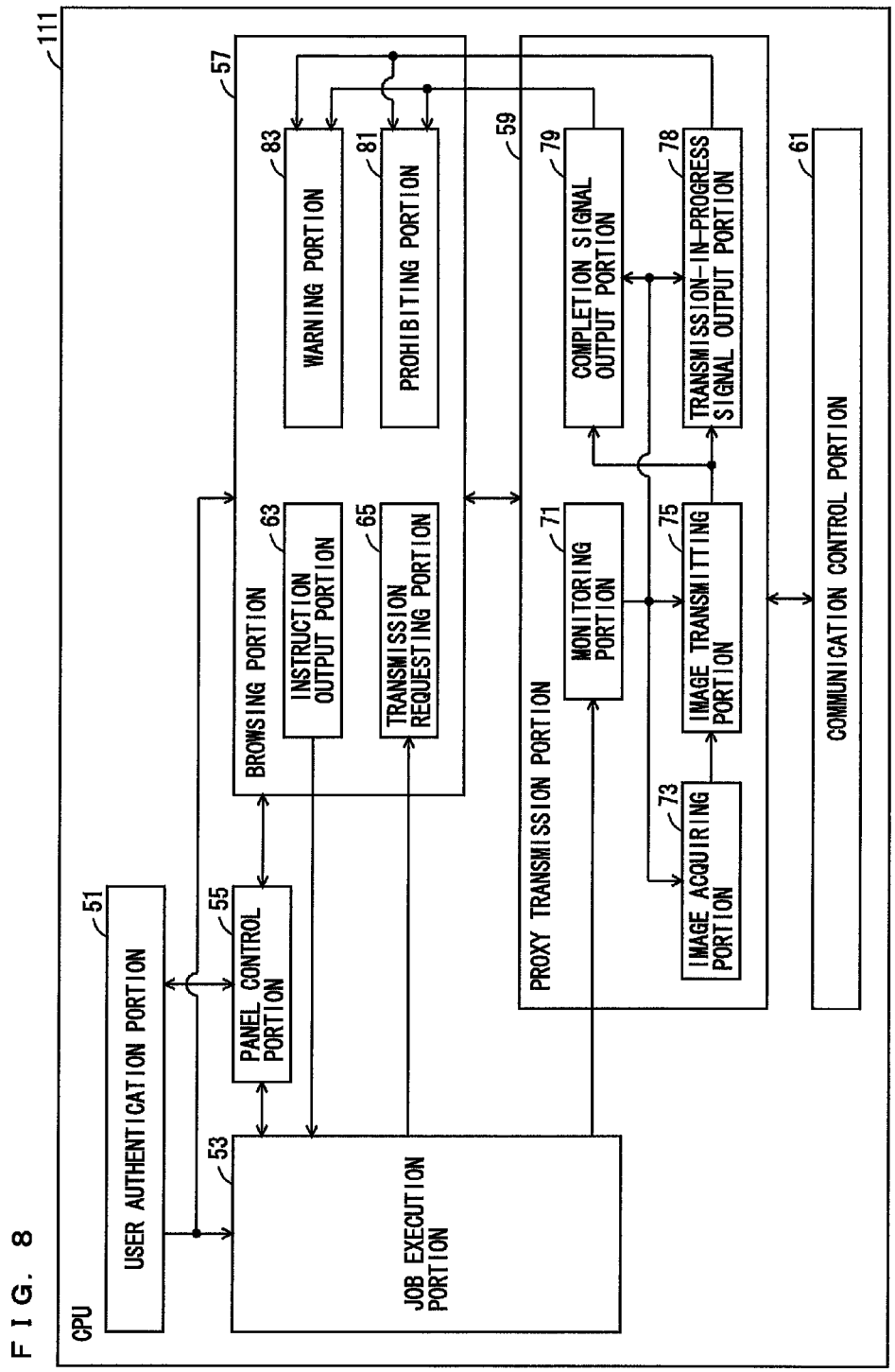
FIG. 8 is a block diagram schematically showing the functions of a CPU included in the MFP according to a second embodiment.

FIG. 8 is a block diagram schematically showing the functions of the CPU included in the MFP according to the second embodiment. The functions of CPU 111 shown in FIG. 8 are implemented as CPU 111 executes the browsing program and the uploading program stored in ROM 113, EEPROM 115, HDD 116, or CD-ROM 119A.

Referring to FIG. 8, the functions are different from those shown in FIG. 5 in that browsing portion 57 includes a prohibiting portion 81 and a warning portion 83 instead of discarding portion 67, and proxy transmission portion 59 includes a transmission-in-progress signal output portion 78 and a completion signal output portion 79 instead of dummy signal output portion 77. The other functions are identical to those shown in FIG. 5, and thus, a description thereof will not be repeated here.

In proxy transmission portion 59, transmission-in-progress signal output portion 78 receives communication identification information from monitoring portion 71 and a transmission start signal from image transmitting portion 75. The transmission start signal is a signal which is output when image transmitting portion 75 starts transmitting an image. When receiving the transmission start signal from image transmitting portion 75, transmission-in-progress signal output portion 78 outputs a transmission-in-progress signal to browsing portion 57 on the basis of the communication identification information. The transmission-in-progress signal is a signal indicating that image transmitting portion 75 is now transmitting an image to Web server 7 and that the communication session established between browsing portion 57 and Web server 7 is now in use.

Completion signal output portion 79 receives communication identification information from monitoring portion 71 and an upload completion signal from image transmitting portion 75. The upload completion signal is a signal that image transmitting portion 75 outputs at the time when it completed the transmission of data and has received an upload completion signal from Web server 7, and is the same signal as the one received from Web server 7. When receiving the upload completion signal from image transmitting portion 75, completion signal output portion 79 outputs to browsing portion 57 the same upload completion signal as the one that was input from image transmitting portion 75, on the basis of the communication identification information.

Prohibiting portion 81 included in browsing portion 57 is configured to prohibit the communication between browsing portion 57 and communication control portion 61 during a time period from when a transmission-in-progress signal is received from transmission-in-progress signal output portion 78 until when an upload completion signal is received from completion signal output portion 79. This enables image transmitting portion 75 to transmit data to and receive data from Web server 7 by using the communication session established between browsing portion 57 and Web server 7.

Warning portion 83 included in browsing portion 57 outputs a warning message to panel control portion 55 during a time period from when a transmission-in-progress signal is received from transmission-in-progress signal output portion 78 until when an upload completion signal is received from completion signal output portion 79, so that the warning message is displayed on display portion 103. The warning message may read, for example, "Browsing is currently unavailable." This allows the user to know that the user cannot browse. However, this only means that browsing portion 57 is unable to perform communication. The user is able to input an operation to operation portion 105 on operation panel 9, for example to terminate the processing being performed in browsing portion 57, or to cause job execution portion 53 to execute a print job, a copy job, a facsimile job, or an image read job. This prevents browsing portion 57 from occupying the communication session and hindering any other jobs by MFP 100.

FIG. 9 is a timing diagram illustrating an example of the flow of the processing performed in the MFP and the Web server according to the second embodiment. Referring to FIG. 9, this diagram is different from the timing diagram shown in FIG. 7 in that in the processing carried out by browsing portion 57, steps S06A and S06B have been added between steps S06 and S07, and step S08 has been deleted, and that in the processing carried out by proxy transmission portion 59, the order of steps S59 and S60 has been reversed and a step S58A has been added between steps S58 and S60. The other processing is identical to that shown in FIG. 7, and thus, a description thereof will not be repeated here.

When proxy transmission portion 59 starts a proxy transmission of an image in step S58, it outputs a transmission-in-progress signal to browsing portion 57 (step S58A). Then, when detecting an upload completion signal transmitted from Web server 7, proxy transmission portion 59 transmits a signal indicating the end of image transmission to Web server 7 (step S60). Thereafter, proxy transmission portion 59 outputs an upload completion signal to browsing portion 57 (step S59).

On the browsing portion 57 side, after browsing portion 57 transmits an upload command in step S06, when a transmission-in-progress signal is received in step S06A, browsing portion 57 displays a warning message on display portion 103 (step S06B). This notifies the user that browsing is unavailable. The warning message is displayed until an upload completion signal is input from proxy transmission portion 59. As such, the warning message is displayed on display portion 103 while proxy transmission portion 59 is transmitting data to Web server 7, thereby prohibiting browsing portion 57 from communicating with Web server 7.

MFP 100 according to the second embodiment includes prohibiting portion 81 which prohibits the communication between browsing portion 57 and Web server 7 until the data transmission by image transmitting portion 75 is completed. This prevents the image transmitting processing by browsing portion 57 and the image transmitting processing by image transmitting portion 75 from being performed at the same time.

MFP 100 further includes warning portion 83 which displays a message indicating that the communication is in progress, on display portion 103, while image transmitting portion 75 is transmitting data. This allows the user to be notified that browsing is unavailable.

While information processing system 1 has been described in the above embodiment, the present invention may of course be understood as an uploading method for causing MFP 100 to perform the processing shown in FIGS. 7 and 9, or as an uploading program for causing a computer to perform the uploading method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus capable of performing at least one of scanning, printing, copying, and facsimile transmission/reception, the apparatus comprising:
    a communication portion which communicates with an external device;
    an interface portion which serves as an interface with a user;
    a job execution portion which executes at least one of a scan job, a print job, a copy job, and a facsimile transmission/reception job in accordance with an operation accepted by said interface portion;
    a browsing portion which communicates with a Web server via said communication portion in accordance with an operation accepted by said interface portion;
    a monitoring portion which monitors a communication between said browsing portion and said Web server to acquire communication partner information for specifying said Web server and communication identification information for identifying the communication between said browsing portion and said Web server;
    a data acquiring portion which, in response to an event that said monitoring portion detects an upload command for transmitting an image output from said job execution portion to said Web server, acquires on the basis of said upload command the image to be transmitted;
    an image transmitting portion which, on behalf of said browsing portion, transmits said acquired image to said Web server on the basis of said acquired communication partner information and said acquired communication identification information; and
    a dummy signal output portion which, on behalf of said Web server, outputs a completion signal indicating the completion of the uploading as a dummy signal to said browsing portion before said image transmitting portion finishes the transmission of said image.

2. The image processing apparatus according to claim 1, wherein said browsing portion includes a discarding portion which, after said completion signal is input, discards said communication identification information that had been determined between said browsing portion and said Web server when said browsing portion communicated with said Web server.

3. The image processing apparatus according to claim 1, further comprising a prohibiting portion which prohibits said browsing portion from communicating with said Web server until said image transmitting portion finishes the transmission of the image.

4. The image processing apparatus according to claim 1, further comprising a warning portion which displays a message indicating that the communication is in progress, on a display portion during a period in which said image transmitting portion is transmitting the image.

5. The image processing apparatus according to claim 1, further comprising an authentication portion which authenticates an operator on the basis of said accepted operation, wherein
said communication identification information is determined between said browsing portion and said Web server when said browsing portion communicates with said Web server on the basis of an operation input to said interface portion by an operator authenticated by said authentication portion, said communication identification information being determined by said Web server for each authenticated operator.

6. The image processing apparatus according to claim 1, wherein in the case where said monitoring portion detects certificate information and/or an encryption scheme used in the communication between said Web server and said browsing portion, said image transmitting portion, on behalf of said browsing portion, transmits said acquired image to said Web server by using said detected certificate information and/or encryption scheme.

7. The image processing apparatus according to claim 1, further comprising a document reading portion which reads a document to output an image of the document, wherein
said job execution portion acquires an image output from said document reading portion.

8. The image processing apparatus according to claim 1, further comprising a storing portion which stores an image, wherein
said job execution portion acquires an image stored in said storing portion.

9. The image processing apparatus according to claim 1, further comprising an image forming portion which forms said image on a sheet of paper.

10. The image processing apparatus according to claim 1, wherein said job execution portion executes at least one of the scan job, the print job, the copy job, the facsimile transmission/reception job, and an image input/output job.

11. The image processing apparatus according to claim 1, wherein said communication identification information is session identification information or a cookie.

12. An uploading method carried out in an image processing apparatus, said image processing apparatus being capable of performing at least one of scanning, printing, copying, and facsimile transmission/reception, and including
a communication portion which communicates with an external device, and
an interface portion which serves as an interface with a user,
the uploading method causing said image processing apparatus to execute processing comprising:
a job executing step of executing at least one of a scan job, a print job, a copy job, and a facsimile transmission/reception job in accordance with an operation accepted by said interface portion;
a monitoring step of monitoring a communication between a browsing task and a Web server, the browsing task being formed by executing a browsing program to communicate with the Web server in accordance with an operation accepted by said interface portion, and acquiring communication partner information for specifying said Web server and communication identification information for identifying the communication between said browsing task and said Web server;
an acquiring step of, in response to an event that an upload command for transmitting an image that is output as a result of execution of a job in said job executing step to said Web server is detected in said monitoring step, acquiring on the basis of said upload command the image to be transmitted;
an image transmitting step of transmitting, on behalf of said browsing task, said acquired image to said Web server on the basis of said acquired communication partner information and said acquired communication identification information; and
a dummy signal outputting step of outputting, on behalf of said Web server, a transmission completion signal as a dummy signal to said browsing task before the transmission of said image is finished in said image transmitting step.

13. The uploading method according to claim 12, causing said image processing apparatus to further execute a step of, after said completion signal is input, discarding said communication identification information that had been determined between said browsing task and said Web server when said browsing task communicated with said Web server.

14. The uploading method according to claim 12, causing said image processing apparatus to further execute a step of prohibiting said browsing task from communicating with said Web server until the transmission of the image in said image transmitting step is finished.

15. The uploading method according to claim 12, causing said image processing apparatus to further execute a step of displaying a message indicating that the communication is in progress, on a display portion during a period in which the image is being transmitted in said image transmitting step.

16. The uploading method according to claim 12, causing said image processing apparatus to further execute an authentication step of authenticating an operator on the basis of said accepted operation, wherein
said communication identification information is determined between said browsing task and said Web server when said browsing task communicates with said Web server on the basis of an operation input to said interface portion by an operator authenticated in said authentication step, said communication identification information being determined by said Web server for each authenticated operator.

17. The uploading method according to claim 12, wherein said image transmitting step includes a step of, in the case where certificate information and/or an encryption scheme used in the communication between said Web server and said browsing task is detected in said monitoring step, transmitting, on behalf of said browsing task, said acquired image to said Web server by using said detected certificate information and/or encryption scheme.

18. The uploading method according to claim 12, wherein at least one of the scan job, the print job, the copy job, the facsimile transmission/reception job, and an image input/out job is executed in said job executing step.

19. The uploading method according to claim 12, wherein said communication identification information is session identification information or a cookie.

20. A non-transitory computer-readable recording medium encoded with an uploading program carried out in a computer which controls an image processing apparatus, said image processing apparatus being capable of performing at least one of scanning, printing, copying, and facsimile transmission/reception, and including
- a communication portion which communicates with an external device,
- an interface portion which serves as an interface with a user, and
- a job execution portion which executes at least one of a scan job, a print job, a copy job, and a facsimile transmission/reception job in accordance with an operation accepted by said interface portion, the uploading program causing said computer to execute processing comprising:
- a monitoring step of monitoring a communication between a browsing task and a Web server, the browsing task executing a browsing program, and acquiring communication partner information for specifying said Web server and communication identification information for identifying the communication between said browsing task and said Web server;
- an acquiring step of, in response to an event that an upload command for transmitting an image output from said job execution portion to said Web server is detected in said monitoring step, acquiring on the basis of said upload command the image to be transmitted;
- an image transmitting step of transmitting, on behalf of said browsing task, said acquired image to said Web server on the basis of said acquired communication partner information and said acquired communication identification information; and
- a dummy signal outputting step of outputting, on behalf of said Web server, a transmission completion signal as a dummy signal to said browsing task before the transmission of said image is finished in said image transmitting step.

21. The non-transitory computer-readable recording medium encoded with the uploading program according to claim 20, wherein the uploading program causes said computer to further execute a step of, after said completion signal is input, discarding said communication identification information that had been determined between said browsing task and said Web server when said browsing task communicated with said Web server.

22. The non-transitory computer-readable recording medium encoded with the uploading program according to claim 20, wherein the uploading program causes said computer to further execute a step of prohibiting said browsing task from communicating with said Web server until the transmission of the image in said image transmitting step is finished.

23. The non-transitory computer-readable recording medium encoded with the uploading program according to claim 20, wherein the uploading program causes said computer to further execute a step of displaying a message indicating that the communication is in progress, on a display portion during a period in which the image is being transmitted in said image transmitting step.

24. The non-transitory computer-readable recording medium encoded with the uploading program according to claim 20, wherein
the uploading program causes said computer to further execute an authentication step of authenticating an operator on the basis of said accepted operation, and
said communication identification information is determined between said browsing task and said Web server when said browsing task communicates with said Web server on the basis of an operation input to said interface portion by an operator authenticated in said authentication step, said communication identification information being determined by said Web server for each authenticated operator.

25. The non-transitory computer-readable recording medium encoded with the uploading program according to claim 20, wherein said image transmitting step includes a step of, in the case where certificate information and/or an encryption scheme used in the communication between said Web server and said browsing task is detected in said monitoring step, transmitting, on behalf of said browsing task, said acquired image to said Web server by using said detected certificate information and/or encryption scheme.

26. The non-transitory computer-readable recording medium encoded with the uploading program according to claim 20, wherein at least one of the scan job, the print job, the copy job, the facsimile transmission/reception job, and an image input/output job is executed in said job executing step.

27. The non-transitory computer-readable recording medium
encoded with the uploading program according to claim 20, wherein said communication identification information is session identification information or a cookie.

* * * * *